United States Patent
Zwart et al.

(10) Patent No.: US 11,903,515 B2
(45) Date of Patent: Feb. 20, 2024

(54) DRINKS MACHINE WITH HOT WATER AND STEAM DELIVERY AND A METHOD OF USE

(71) Applicant: KONINKLIJKE PHILIPS N.V., Eindhoven (NL)

(72) Inventors: Bart-Jan Zwart, Eindhoven (NL); Peter Aljosja Kot, Eindhoven (NL); Ede Szabo, Eindhoven (NL); Oliver Fecko, Eindhoven (NL); Tim Gerard Tibbe, Eindhoven (NL); Mérijn Stam, Eindhoven (NL); Vittorio Perazzolo, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 548 days.

(21) Appl. No.: 16/958,723

(22) PCT Filed: Dec. 21, 2018

(86) PCT No.: PCT/EP2018/086655
§ 371 (c)(1),
(2) Date: Jun. 28, 2020

(87) PCT Pub. No.: WO2019/129725
PCT Pub. Date: Jul. 4, 2019

(65) Prior Publication Data
US 2020/0329899 A1    Oct. 22, 2020

(30) Foreign Application Priority Data

Dec. 29, 2017 (EP) .................................... 17211073

(51) Int. Cl.
*A47J 31/24* (2006.01)
*A47J 31/44* (2006.01)

(52) U.S. Cl.
CPC .......... *A47J 31/24* (2013.01); *A47J 31/4475* (2013.01); *A47J 31/4485* (2013.01); *A47J 31/4489* (2013.01)

(58) Field of Classification Search
CPC .... A47J 31/24; A47J 31/4475; A47J 31/4485; A47J 31/4489
(Continued)

(56) References Cited

U.S. PATENT DOCUMENTS

2006/0254428 A1\* 11/2006 Glucksman ......... A47J 31/3614
99/302 P
2007/0243305 A1 10/2007 Marconi
(Continued)

FOREIGN PATENT DOCUMENTS

| CN | 102348402 A | 2/2012 |
| CN | 104736022 A | 6/2015 |

(Continued)

OTHER PUBLICATIONS

Extended European Search Report issued in connection with corresponding EP Application No. 17211073.6 dated Jul. 4, 2018.
(Continued)

*Primary Examiner* — Dana Ross
*Assistant Examiner* — Joseph W Iskra
(74) *Attorney, Agent, or Firm* — Maschoff Brennan

(57) ABSTRACT

A drinks machine has an output nozzle for delivering hot water or steam, Steam is used by a milk frothing unit whereas hot water is delivered by the output nozzle directly to the exterior of the drinks machine for collection in a drinks vessel. A single nozzle is thus provided for steam or hot water delivery and there is no need for any accessory when delivering hot water. This means that there is reduced cost, fewer components to lose, and simplified cleaning, in that only per-use cleaning of the milk frothing unit is
(Continued)

required, not the fixed parts of the appliance associated with the milk frothing unit.

15 Claims, 4 Drawing Sheets

(58) Field of Classification Search
USPC .......................................................... 99/323.1
See application file for complete search history.

(56) References Cited

U.S. PATENT DOCUMENTS

| | | |
|---|---|---|
| 2014/0123858 A1* | 5/2014 | Rellis .................. A47J 31/4403 |
| | | 99/293 |
| 2014/0270725 A1* | 9/2014 | Bertolini ................. F25D 23/04 |
| | | 392/341 |
| 2015/0335195 A1 | 11/2015 | Beaudet et al. |
| 2017/0325625 A1* | 11/2017 | Menashes ......... A47J 27/21016 |

FOREIGN PATENT DOCUMENTS

| | | |
|---|---|---|
| RU | 2506875 C2 | 2/2014 |
| WO | 2017103709 A1 | 6/2017 |

OTHER PUBLICATIONS

International Search Report and Written Opinion issued in connection with corresponding PCT Application No. PCT/EP2018/086655 dated Feb. 11, 2019.

* cited by examiner

DRINKS MACHINE WITH HOT WATER AND STEAM DELIVERY AND A METHOD OF USE

CROSS-REFERENCE TO RELATED APPLICATIONS

The present application is a U.S. National Phase application under 35 U.S.C. § 371 of International Application No. PCT/EP2018/086655, filed on Dec. 21, 2018, which claims the benefit of European Patent Application No. 17211073.6, filed on Dec. 29, 2017. These applications are hereby incorporated by reference herein.

FIELD OF THE INVENTION

This invention relates to drinks machines, and in particular drinks machines which have a hot water output (for example to enable a user to make tea or soup) and a steam output (for example for use in heating and/or frothing milk).

BACKGROUND OF THE INVENTION

Typically, espresso appliances provide the function of automated cappuccino brewing. In most cases, steam is used for heating and/or frothing the milk, in a similar manner to a barista.

In a first type of appliance, milk frothing is achieved with a container type or carafe type milk frothing unit, which is connectable to a steam outlet of the appliance for receiving steam out of the appliance. This steam is used to heat and/or froth the milk stored in the milk frothing unit. The steam outlet is typically integrated in a socket-like interface in the housing of the appliance. The milk frothing unit is positioned outside the housing of the appliance and plugged into the interface. The milk frothing unit may be readily removed, to improve the ease of cleaning. In particular, all parts that come in contact with milk need to be cleaned regularly.

Since an espresso appliance heats up water for coffee, it can also supply hot water for tea etc. This may be dispensed via a separate dedicated outlet, which projects from the appliance so as to allow a cup to be positioned directly underneath.

There are problems with such separate dedicated outlets, one for the supply of hot water and one for the supply of steam. These include additional cost and size as well as a larger number of components that can fail. The cleaning routine, in particular a descaling procedure, is also complicated as there are multiple outlets that need to be cleaned.

It is also known to provide a hot water dispense unit which can be attached to the steam outlet (instead of the milk frothing unit) for the delivery of hot water. In this way, a single outlet may be used for providing steam when the milk frothing unit is attached and for providing hot water when a hot water dispense unit is attached. When a single outlet is provided, it is typically again configured as a socket-like interface and the milk frothing unit and the separate hot water dispense unit may selectively be plugged into the interface.

A problem with this approach is that the user then has multiple connecting units, which are prone to getting lost, as well as adding cost to the overall appliance. For example, U.S. Pat. No. 7,946,219 discloses a coffee machine in which an outlet can provide steam to a milk frothing unit or water to a cup through an additional nozzle.

In a second type of appliance, milk frothing is achieved with a tube type milk frothing unit, also-called cappuccinatore or pannarrello. To froth milk, the tube must be dipped into a container of milk and thus will become contaminated therewith. When subsequently used for delivery of hot water for making tea, etc., this water may contain undesired milk particles. Therefore, typically the tube is not used for delivery of hot water. Instead, again a separate dedicated outlet may be provided, with the aforementioned associated drawbacks.

US 2014/0123858 discloses a beverage machine with a frothing device. A steam head has an output nozzle which can connect to the frothing device. The frothing device has an in-line valve leading to an output nozzle to be submerged under milk to be frothed. US 2017/0325625 discloses a steamer which may be controlled to deliver steam or hot water.

There remains a need for a drinks machine design which enables steam and hot water delivery in a cost effective manner, and which is easy to use and easy to clean for the user.

SUMMARY OF THE INVENTION

The invention is defined by the claims.

According to examples in accordance with an aspect of the invention, there is provided a drinks machine comprising a water heater, a user interface for enabling the user selection of a hot water option or an option which requires generation of steam, and an output nozzle for delivering hot water or steam depending on the selection at the user interface. Furthermore, a milk frothing unit may be provided having a steam inlet. The steam inlet may be detachably associated to the output nozzle for receiving steam therefrom. The drinks machine is configurable in at least two modes:

a first mode in which the hot water option is selected at the user interface. In this mode, the steam inlet of the milk frothing unit is not associated to the output nozzle so that hot water can be delivered by the output nozzle directly to the exterior of the drinks machine for collection in a drinks vessel; and a second mode in which the selection at the user interface is the option which requires generation of steam. In this mode, the steam inlet of the milk frothing unit is detachably associated to the output nozzle so that steam can be delivered by the output nozzle to the steam inlet of the milk frothing unit.

In this drinks machine, a single output nozzle is provided for steam or hot water delivery. Hot water can be delivered directly to a drinks vessel, for example for making tea, hot chocolate or soup, or steam can be delivered to a milk frothing unit. The output nozzle does not contact the milk when in the milk frothing mode because a separate milk frothing unit is provided, so that there is no contamination of the nozzle with milk during use and consequently no contamination of hot water when in the first or hot water mode. Also, cleaning of the output nozzle is made easier or can be less frequent, since it only ever serves to pass steam or water. Only one separate specially designed unit is needed (the milk frothing unit) as hot water can be delivered directly to any drinks vessel (mug or cup) of suitable size.

The output nozzle may face downwardly so that there is no danger to the user of steam being directed toward the user in the second mode. Note that downwardly does not mean the nozzle has to face perfectly vertically downwards in use. It may for example be oriented at less than 45 degrees offset from a vertically downward direction, more preferably less than 30 degrees offset.

By "directly to the exterior of the drinks machine" is meant that the hot water passes as a flow through ambient air to be caught in a vessel. In other words, the hot water flows straight from the output nozzle into the drinks vessel without passing any other part (of the drinks machine or milk frothing unit) or in still other words, without passing any milk contacting part.

The selection at the user interface for the second mode may comprise selection of a milk-based recipe, i.e. a drink selection which involves the preparation of frothed milk as part of an automated drink-making process. The selection at the user interface may instead be for the selection of steam for example for heating or frothing milk independently of the preparation of a drink. Thus, the "option which requires generation of steam" may be a recipe (i.e. a type of drink such as cappuccino) which makes use of frothed milk and therefore requires steam generation, or it may be a user selection simply to generate heated or frothed milk.

The output nozzle may be located in a docking region for receiving the drinks vessel or the milk frothing unit.

This docking region can be used for delivery of hot water or for steam deliver for milk heating or frothing. This enables a compact design, and which is easy and intuitive to use.

The drinks machine may comprise a drip tray beneath the output nozzle.

This drip tray thus serves to catch hot water spillage when the first, hot water mode is selected.

The drip tray is preferably also beneath the milk output of the milk frothing unit when the drinks machine is in the second mode.

The drip tray thus serves to catch milk spillage when the second mode is selected and no receiving cup is placed on the drip tray.

The output nozzle may project outwardly from an external face, for example a front face of the machine and is angled away from the face in the absence of the frothing unit.

The angle of the nozzle means the hot water is projected slightly forwards from the external face, so that the nozzle does not need to protrude far, but still enables the hot water to be directed to the center of a mug or other collection vessel.

The angle is for example in the range 5 to 25 degrees. Thus, the output nozzle may not extend perfectly vertically downwards, but may be slightly angled forwards toward the intended location of a drinks vessel when in the first, hot water mode.

The output nozzle may project outwardly from the external face by less than 4 cm, for example less than 3 cm, for example less than 2 cm.

This provides a compact and aesthetically pleasing design.

The output nozzle may comprise a movable or deformable tip which engages with the milk frothing unit in the second mode.

The tip functions as a retaining mechanism between the milk frothing unit and the output nozzle, and helps to ensure a sealed connection between the two.

In one set of examples, the output nozzle may be rotatable between a first direction which is offset from the vertical when in the first mode, and a second, different direction in the second mode, e.g. closer to a vertical direction In another set of examples, the output nozzle may be movable (e.g. translated) between a first position when in the first mode, and a second position when in the second mode.

In both cases, the milk frothing unit can be placed in a more flush position against the machine. This means the size of drip tray which can serve to collect both hot water spillage and milk spillage may be reduced, enabling a compact overall design.

In yet another set of examples, the output nozzle may have a fixed position.

The milk frothing unit may comprise a receiving chamber which fits over the output nozzle. This makes alignment of the milk frothing unit simple for the user.

The milk frothing unit may comprise a milk container and a channel arrangement for mixing milk from the milk container with steam from the output nozzle downstream of the steam inlet.

This channel arrangement means the output nozzle does not become contaminated with milk so that cleaning is made easier. For example, capillary forces may be used to draw fluid along the channels, and a mixing chamber based on the Venturi effect may be used (downstream of the steam output nozzle) to provide mixing of steam, milk and air and hence to froth as well as heat the milk.

The drinks machine may comprises a coffee machine, which is configurable in the second mode additionally to deliver coffee from a coffee output, thereby providing automated generation of a milk-based coffee recipe.

Thus, the second mode may comprise a frothed milk-based coffee recipe, in which there is the automated delivery of coffee and heated and/or frothed milk. This provides a full automatic functionality in the sense of being able to automatically prepare milk-based coffee drinks. The drinks machine may of course have other modes of operation, including coffee recipes which do not require frothed milk.

A dedicated output nozzle is for example provided for delivering coffee. In the case of a milk-based coffee recipe, the milk frothing unit may be placed at one location and a drinks vessel may be placed adjacent the milk frothing unit, so that the drinks vessel is able to receive coffee (without milk) from the dedicated coffee output nozzle and receive frothed milk from an output nozzle of the milk frothing unit.

The drinks machine may comprise a water pumping system and a brew chamber or brew group for receiving coffee grind, either pre-portioned in a pod or capsule or obtained from a bean grinder which may be included in the machine (e.g. a so-called bean-to-cup espresso machine).

The invention also provides a method of using a drinks machine, wherein the drinks machine comprises: a water heater; a user interface for enabling user selection of a hot water option or an option which requires generation of steam; an output nozzle for delivering hot water or steam depending on the selection at the user interface; and a milk frothing unit, wherein the method comprises operating the drinks machine, at different times, in:
  a first mode in which the hot water option is selected at the user interface, and hot water is delivered by the output nozzle directly to a drinks vessel; and
  a second mode in which a selection at the user interface corresponds to steam delivery by the output nozzle to the steam inlet of the milk frothing unit, and steam is delivered by the output nozzle to the milk frothing unit.

The drinks vessel may be a mug, jug or cup for example.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1A:
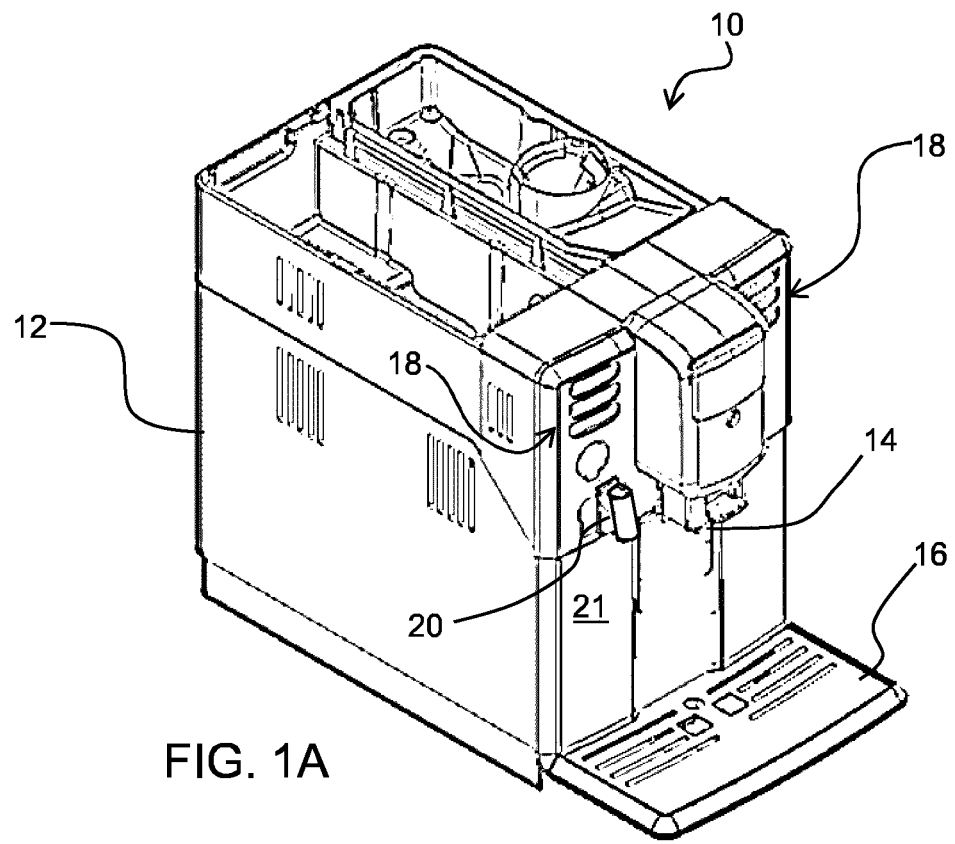
FIGS. 1A and 1B show two views of a drinks machine.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a drinks machine having an output nozzle for delivering hot water or steam. Steam is used by a milk frothing unit whereas hot water is delivered by the output nozzle directly to the exterior of the drinks machine for collection in a drinks vessel. A single output nozzle is thus provided for steam or hot water delivery and there is no need for any accessory when delivering hot water. This means that there is reduced cost, fewer components to lose. The output nozzle does not come in contact with milk. This means that hot water can be delivered by the output nozzle free from milk contamination. It further means simplified cleaning, in that only per-use cleaning of the milk frothing unit is required, not the fixed parts of the appliance associated with the milk frothing unit.

Figure 1B:
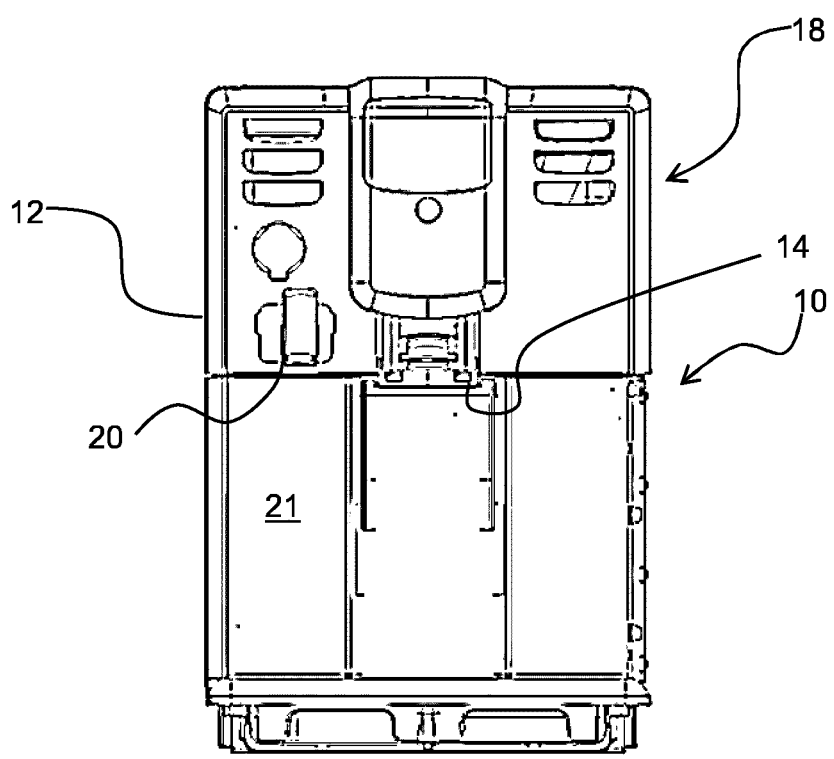

FIGS. 1A and 1B shows the drinks machine 10 in the form of an espresso coffee machine. FIG. 1A shows a perspective view and FIG. 1B shows a view from in front. This example is a bean-to-cup machine, although other options are possible as mentioned further below.

It comprises a main body 12 which houses a water reservoir, a water heater and a reservoir for receiving coffee beans. There is an internal grinding mechanism for creating coffee grind, a brewing chamber or brew group for receiving the coffee grind, and a pumping system for pumping heated water through the coffee grind.

The machine comprises a coffee output 14 from which the espresso drink (without milk) is output. The coffee output 14 faces downwardly and is located over a drip tray 16. FIGS. 1A and 1B also show a user interface 18 for receiving user selections, such as for water selection and for other drinks selections. The hot water selection is referred to below as a "first mode" or a "hot water mode". At least some of the drinks selections relate to drinks recipes which include frothed milk and therefore require the generation of steam. There may also be an option for the generation of steam without being part of a drink selection, for example to enable the user to generate heated and/or frothed milk independently of any drink to be made by the machine. These options are generally referred to below as a "second mode" or a "milk frothing mode".

The operation of the machine in generating an espresso coffee drink is entirely conventional, and the general operation of the coffee machine will not be described further.

Furthermore, the illustrated full function espresso machine is only one example of the type of coffee machine to which the invention may be applied.

This invention relates to an output nozzle 20 which is provided for delivering steam or hot water. This depends on user selection at the user interface 18. The steam output may be used for heating and/or frothing milk, and the option of a hot water only output gives additional options to the user, for example for making soup, tea, hot chocolate etc.

The output nozzle 20 is located in a docking region 21 for receiving a drinks vessel or a milk frothing unit. This docking region 21 can be used for delivery of hot water and for steam delivery. This enables a compact design, and which is easy and intuitive to use.

Figure 2A:
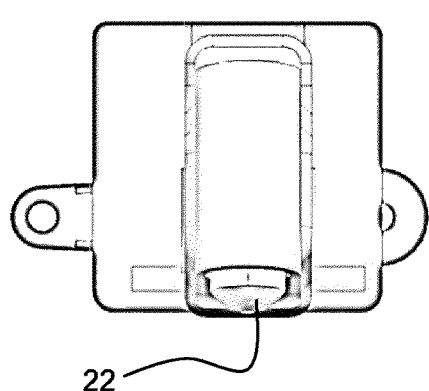
FIGS. 2A to 2D show four views of an output nozzle used in the machine of FIGS. 1A and 1B.
Figure 2B:
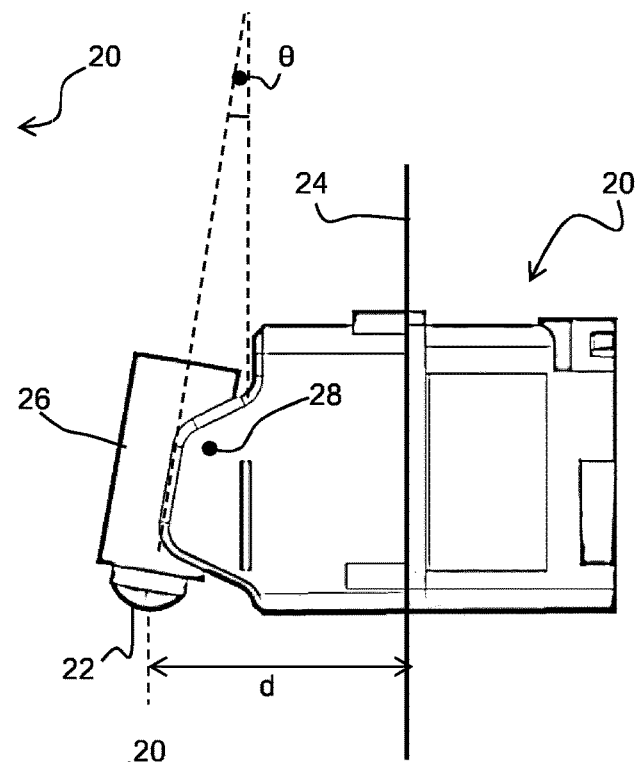
Figure 2C:
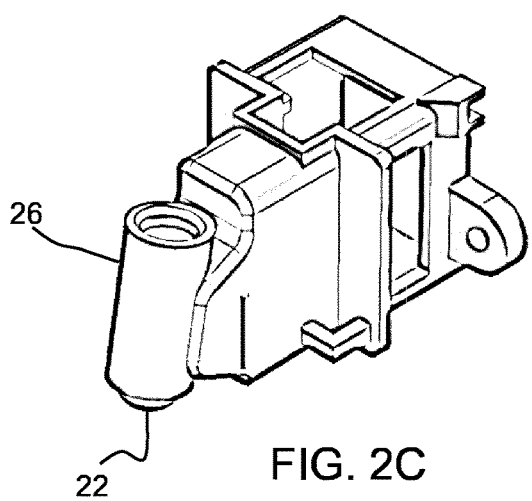
Figure 2D:
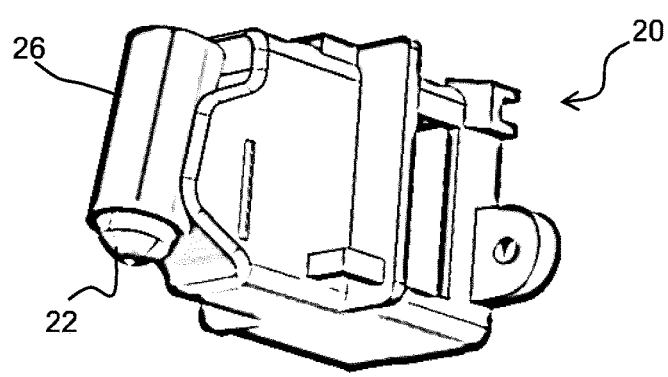

The output nozzle 20 is shown in more detail in FIGS. 2A to 2D. FIG. 2A shows a front view, FIG. 2B shows a side view, FIG. 2C shows a perspective view from above and FIG. 2D shows a perspective view from below.

The output nozzle 20 comprises an output tip 22 having an output orifice which faces generally downwardly in use, so that hot water is directed down to a vessel in which it is to be caught, and steam is generated in a safe downward direction.

Figure 3A:
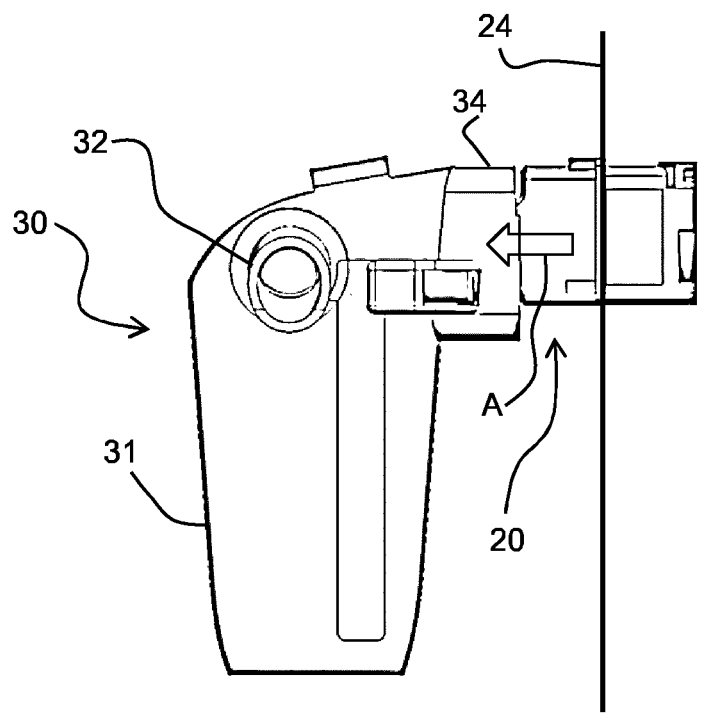
FIGS. 3A and 3B show two views of a milk frothing unit used in the machine of FIGS. 1A and 1B.
Figure 3B:
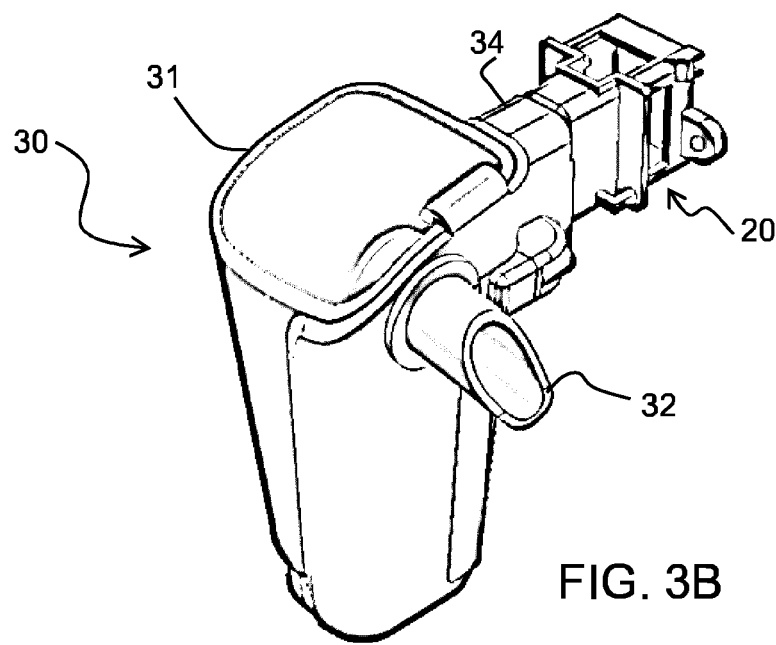
Figure 4A:
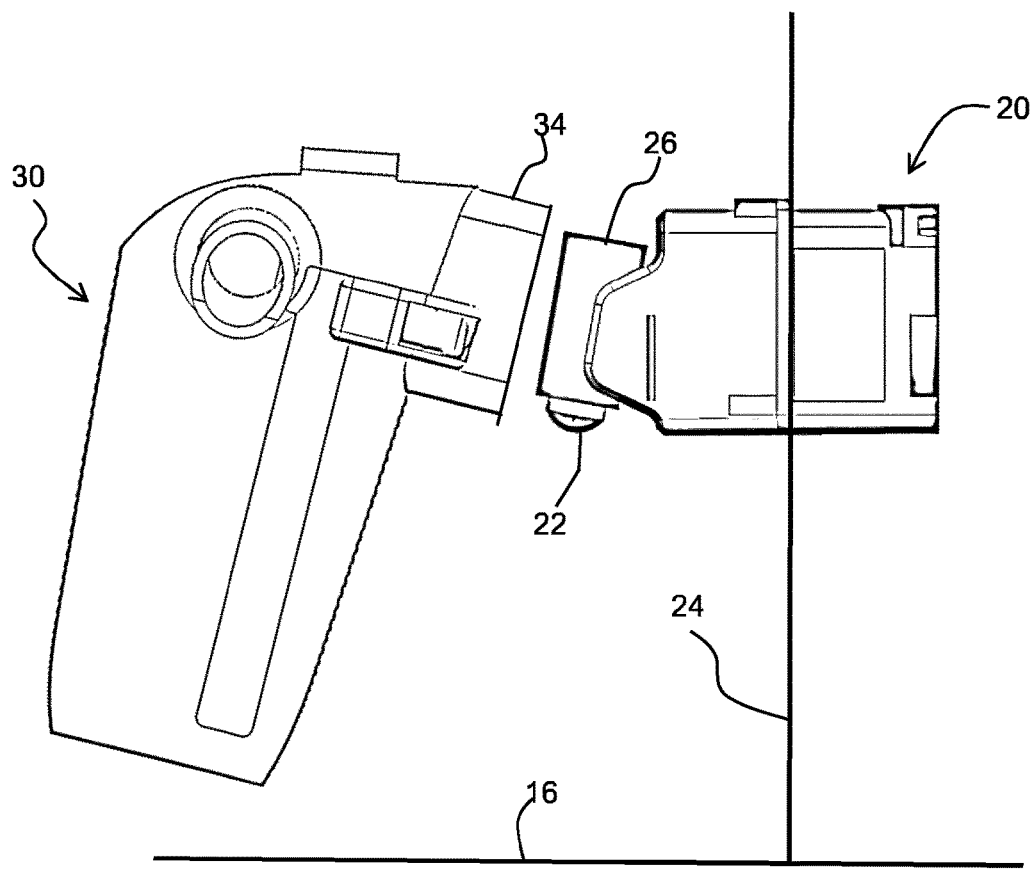
FIG. 4A shows how to attach the milk frothing unit of FIGS. 3A and 3B to the machine.
Figure 4B:
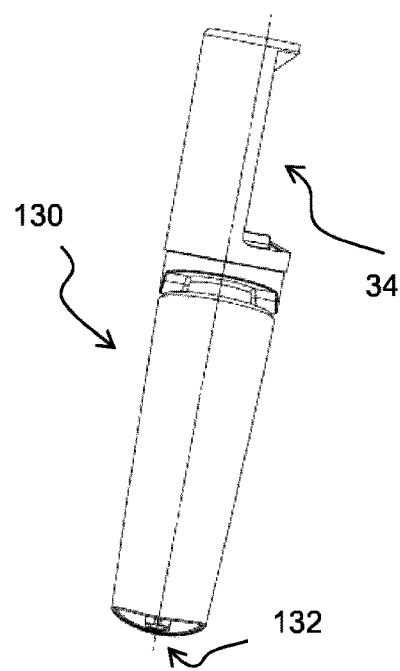
FIG. 4B shows an alternative embodiment of a milk frothing unit and how to attach this milk frothing unit to the machine.

When steam is delivered, it is provided to a steam inlet of a milk frothing unit (shown in FIGS. 3 and 4). Many milk frothing units are known (and commercially available) which make use of a steam inlet for the frothing and heating of milk. The milk frothing unit may for example comprise a milk container and a frothed milk output as illustrated in FIGS. 3A, 3B and 4A. Alternatively, the milk frothing unit may comprise a milk frothing tube (cappuccinatore, pannarello) as illustrated in FIG. 4B.

The output tip 22 may be spring-loaded or otherwise elastically deformable or retractable so that it deforms or retracts when the milk frothing unit is inserted, and is in this way biased (elastically, by gravity or otherwise) to provide a seal. The tip 22 may thus function as a retaining mechanism between the milk frothing unit and the output nozzle, as well as ensuring a sealed connection between the two.

When hot water is delivered, it is provided by the output nozzle 20 directly to the exterior of the drinks machine for collection in a drinks vessel. Thus, the orifice 22 defines the external interface of the steam/hot water path, either to the ambient surroundings when a flow of hot water is provided or to a coupled milk frothing unit when steam is provided.

The milk frothing unit is designed so that output nozzle 20 does not contact the milk when in the milk frothing mode so that there is no contamination of the nozzle with milk during use. In this way, there is no risk of the dispensed hot water being contaminated with milk when in the hot water mode. Moreover, cleaning of the output nozzle 20 is made easier or can be less frequent, since it only ever serves to pass steam or water.

FIG. 2B shows that the output nozzle 20 is directed downwardly with an offset to the vertical of an angle θ which is for example less than 30 degrees, for example less than 20 degrees, such as 15 degrees. The nozzle 20 is angled away from an external face, here the front face 24 of the machine, from which the output nozzle projects. Thanks to such angle θ the nozzle does not need to project as far as the center of a hot water receiving vessel (e.g. mug). The projection distance d is for example less than 4 cm, for example less than 3 cm, or even less than 2 cm.

The output nozzle 20 may have a fixed position and orientation. However, in the illustrated example, the output nozzle 20 has an output tube 26 which is pivotable about an axis 28, and having the output tip 22 at its lower end. The output tube 26 may be rotatable about this axis 28 between a first direction which is offset from the vertical (when in the first, hot water delivery mode), and a second, different direction (when in the second, milk frothing mode). The second direction may be more vertical than the first direction and indeed it may be fully vertical. This second orientation is intended to be more compact, and may be used when the output nozzle 20 is coupled to a milk frothing unit so that the milk frothing unit can dock as closely as possible to the machine. This in turn enables a small drip tray 16 to be used to catch both hot water spillage and frothed milk spillage.

The output nozzle 20 may be rotatable in other directions, for example sideward which may in particular be advantageous if used with the cappuccinatore shown in FIG. 4B, as will be detailed below.

The output nozzle 20 may be movable in any other way, for example translatable between a first position when in the first mode, and a second position when in the second mode.

FIGS. 3A and 3B show one example of a milk frothing unit. FIG. 3A shows a side view and FIG. 3B shows a perspective view.

The milk frothing unit 30 comprises a milk carafe or container 31 for receiving milk, a steam inlet for receiving steam (shown by arrow A) from the output nozzle 20 and a milk output 32 for heated and/or frothed milk.

The milk frothing unit 30 comprises a steam channel which receives the steam flow from the output nozzle 20 via the steam inlet, and a milk channel that draws milk up from the base of the milk container 30 to the top. A mixing chamber mixes the steam and milk for heating the milk, and optionally air for providing the desired frothing function.

In particular, in one example of the milk frothing unit 30, the milk may flow along the milk channel due to a negative pressure generated by the steam flowing from the steam channel.

Air may be drawn into the mixing chamber so that there is a milk, steam and air mixture entering the mixing chamber. The aim of the mixing chamber is to release large bubbles and retain only small air bubbles in the mixture. The air, milk and steam mixture forms the fluid that enters the mixing chamber, and the mixed output forms the heated and/or frothed milk provided to the milk output 32.

Thanks to the channel arrangement, the output nozzle 20 and in particular its tip 22 do not become contaminated with milk so that cleaning is made easier. In particular, the mixing chamber of the milk frothing unit 30 is sufficiently far downstream of the steam inlet.

Note that to the extent described above, the design and operation of the milk frothing unit is known. Furthermore, it is only one possible design and many other designs may be used such as for example a tube type milk frothing unit (cappuccinatore, pannarrello) as illustrated in FIG. 4B. In this figure, components that are similar to the components shown in FIGS. 3A, 3B and 4A have been denoted with similar reference numerals increased by 100.

The milk frothing units have a receiving chamber 34, 134 which fits over the output nozzle 20 to make alignment of the milk frothing unit 30, 130 simple for the user.

FIGS. 4A and 4B show how the milk frothing units 30, 130 can be docked to the machine. It is approached at an angle so that the receiving chamber 34, 134 aligns with the output nozzle 20. When the receiving chamber 34, 134 is pushed over the output nozzle 20, the output tip 22 retracts against its spring, elastic, gravity or other bias. The output tip is then received in a recess internal to the receiving chamber 34, 134 so that the orifice of the output tip 22 is aligned with and sealed against the steam inlet of the steam channel of the milk frothing unit. This also connects the two parts together, although other or additional snap fit or push fit connection arrangements may be provided.

After engagement, the milk frothing unit 30, 130 may be rotated downwardly. It then adopts a more flush position against the front face 24. As illustrated in FIG. 4A, the milk frothing unit 30 may then sit on the drip tray 16. This provides a simple attachment, because the base of the milk frothing unit 30 is clear of the drip tray 16 during the initial connection, as shown in FIG. 4A. FIG. 3A shows the vertical orientation of the milk frothing unit. In an alternative embodiment, the milk frothing unit 30 may be dimensioned to hang with its base above the drip tray 16 in docked position.

The milk frothing unit 130 of FIG. 4B may be rotated downwardly as well. Preferably, it may be rotatable sideward so as to have its milk output 132 positioned above a drinks vessel located beneath the coffee output 14.

In order to provide a fully automated preparation of a coffee drink which makes use of frothed milk, the drinks vessel is placed beneath the coffee output 14 and the frothing unit 30, 130 is docked to the output nozzle 20. A frothed milk output 32, 132 of the milk frothing unit is directed to the drinks vessel. The milk frothing unit 30 may be placed adjacent the drinks vessel, both on the drip tray. The coffee machine implements a preparation sequence to deliver the drink recipe selected at the user interface.

Figure 5:
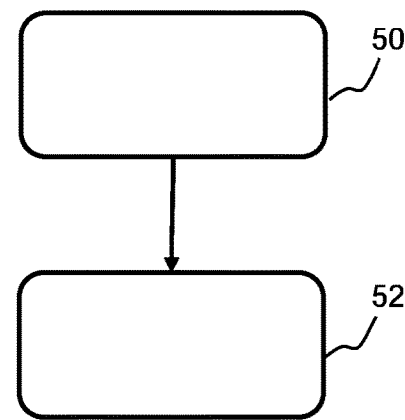
FIG. 5 shows a method of using a drinks machine.

FIG. 5 shows a method of using the drinks machine as described above, namely comprising: a water heater; a user interface for enabling user selection of a hot water option or an option requiring delivery of steam; an output nozzle for delivering hot water or steam depending on the selection at the user interface; and a milk frothing unit.

The method comprises operating the drinks machine, at different times, in:
  a first mode 50 in which hot water delivery is selected at the user interface, and hot water is delivered by the output nozzle directly to a drinks vessel; and
  a second mode 52 in which the selection at the user interface is the option which requires generation of steam, and steam is delivered by the output nozzle to the milk frothing unit.

The invention is of particular interest to a full function bean-to-cup espresso machine, as described above, but the invention can be applied generally to any drinks machine which has both steam and water outputs.

For example, the invention may be applied to a pod-based appliances which receives soft coffee pods, to capsule or cartridge based appliances which receive hard consumables, or to an appliance which receives pre-ground coffee.

The machine may have an internal or external water reservoir or may be plumbed in.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:
1. A drinks machine comprising:
  a housing;

a milk frothing unit external to the housing, having a steam inlet;
a steam outlet integrated in a socket-like interface in the housing for connection to the milk frothing unit;
a water heater; and
a user interface for enabling user selection of a hot water option or an option which requires generation of steam;
wherein the socket-like interface comprises an output nozzle for delivering hot water or steam depending on the user selection at the user interface;
wherein the drinks machine is configurable in at least two modes:
a first mode in which the hot water option is selected at the user interface, and the hot water is delivered by the output nozzle directly to an exterior of the drinks machine for collection in a drinks vessel; and
a second mode in which the user selection at the user interface is the option which requires generation of steam, and the steam is delivered by the output nozzle to the steam inlet of the milk frothing unit, wherein the steam, in the second mode, is delivered by the same output nozzle that delivers the hot water in the first mode, and wherein the output nozzle remains uncontacted with milk in the second mode.

2. The drinks machine of claim 1, wherein the output nozzle is located in a docking region for receiving the drinks vessel or the milk frothing unit.

3. The drinks machine of claim 1, further comprising a drip tray beneath the output nozzle.

4. The drinks machine of claim 3, wherein the drip tray is also beneath frothed milk output of the milk frothing unit when the drinks machine is in the second mode.

5. The drinks machine of claim 1, wherein the output nozzle projects outwardly from an external face of the drinks machine and is angled away from the external face, at least in the absence of the milk frothing unit.

6. The drinks machine of claim 5, wherein an angle (θ) with which the output nozzle is angled away from the external face is in the range of 5 to 25 degrees.

7. The drinks machine of claim 1, wherein the output nozzle projects outwardly from an external face by less than 4 cm.

8. The drinks machine of claim 1, wherein the output nozzle comprises a movable or deformable tip which engages with the milk frothing unit in the second mode.

9. The drinks machine of claim 1, wherein the output nozzle is movable between a first position when in the first mode, and a second position when in the second mode.

10. The drinks machine of claim 1, wherein the output nozzle is rotatable between a first direction which is offset from vertical when in the first mode, and a second, different direction in the second mode.

11. The drinks machine of claim 1, wherein the milk frothing unit comprises a receiving chamber which fits over the output nozzle.

12. The drinks machine of claim 1, wherein the milk frothing unit comprises a channel arrangement for mixing the milk from a milk container with the steam from the output nozzle.

13. The drinks machine of claim 1, further comprising a coffee machine, which is configurable in the second mode additionally to deliver coffee from a coffee output thereby providing automated generation of a milk-based coffee recipe.

14. The drinks machine of claim 13, wherein the coffee machine comprises a water pumping system and a brew chamber for receiving coffee grind, pre-portioned in a pod or capsule, or obtained from a bean grinder.

15. A method of using a drinks machine, wherein the drinks machine comprises: a housing; a milk frothing unit external to the housing, having a steam inlet; a steam outlet integrated in a socket-like interface in the housing for connection to the milk frothing unit; a water heater; and a user interface for enabling user selection of a hot water option or an option which requires generation of steam; wherein the socket-like interface comprises an output nozzle for delivering hot water or steam depending on the user selection at the user interface; wherein the method comprises operating the drinks machine, at different times, in:
a first mode in which the hot water option is selected at the user interface, and the hot water is delivered by the output nozzle directly to a drinks vessel; and
a second mode in which the user selection at the user interface is the option which requires generation of steam, and the steam is delivered by the output nozzle to the milk frothing unit, wherein the steam, in the second mode, is delivered by the same output nozzle that delivers the hot water in the first mode, and wherein the output nozzle remains uncontacted with milk in the second mode.

* * * * *